Feb. 22, 1966    A. ALFORD    3,236,152
COUNTERBALANCED VEHICLE REAR VIEW MIRROR
Filed July 5, 1962
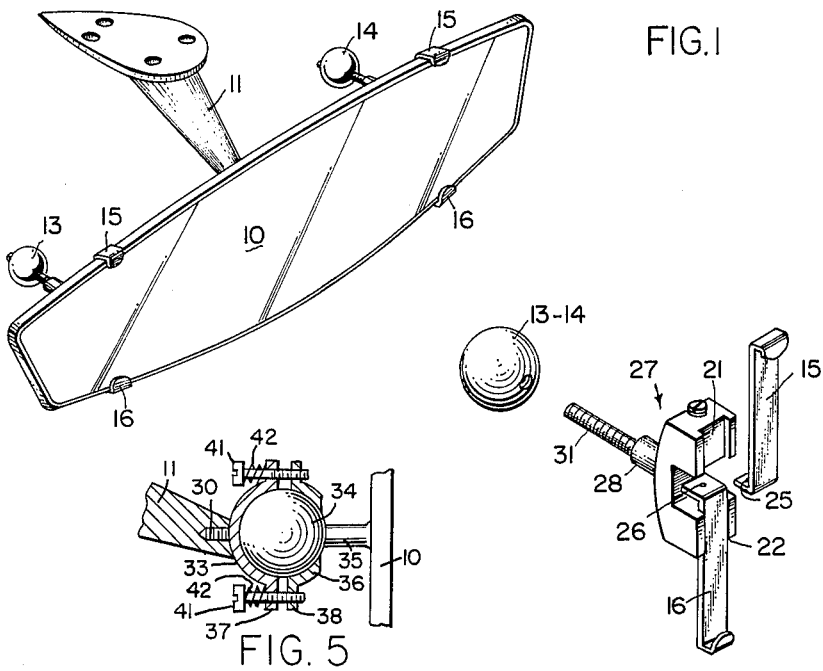
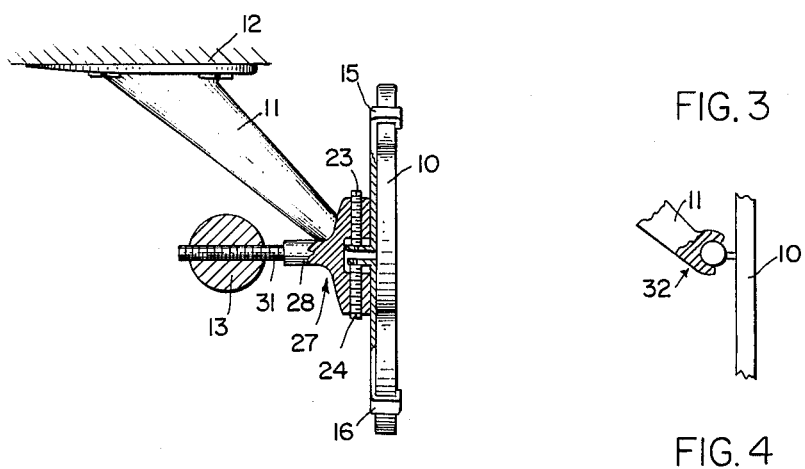
INVENTOR.
ANDREW ALFORD
BY
Ezekiel Wolf, Wolf & Greenfield
ATTORNEYS

United States Patent Office 3,236,152
Patented Feb. 22, 1966

3,236,152
COUNTERBALANCED VEHICLE REAR
VIEW MIRROR
Andrew Alford, 299 Atlantic Ave., Winchester, Mass.
Filed July 5, 1962, Ser. No. 207,756
3 Claims. (Cl. 88—98)

The present invention relates in general to vehicular rear view mirrors and more particularly concerns a novel automobile rear view mirror which may be adjusted to any desired position and will remain in that selected position despite severe vibrations until readjusted. This application is a continuation-in-part of abandoned application Serial No. 179,846 filed March 15, 1962 entitled Vehicle Rear View Mirror.

Most automobile mirrors are mounted on the dashboard or from overhead by means including a ball joint or equivalent. This mounting means enables the driver to adjust the mirror until he obtains the best view of the field to the rear of the automobile. If the adjustable mounting means is too tight, positioning the mirror is difficult. On the other hand, if the movable joint is too loose, vibrations displace the mirror from its selected position and not infrequent readjustment is necessary to insure adequate observation of the field to the rear. The disadvantages from the standpoint of safety are obvious without considering the annoyance to the driver of constant readjustment. The problem is especially serious when both large and small people drive the same car.

The present invention has as an important object the provision of an easily adjustable rear view mirror virtually insensitive to vibrations. Thus, a mirror once adjusted retains the selected position until the driver decides to change the position.

According to the invention, counterbalancing means are provided on the adjustable mirror to oppose the moment of the mirror itself about the point of adjustment. Preferably, the summation of moments about the mirror pivot point is substantially zero. Expressed in other words, the center of gravity of the mirror assembly including counterweighting means should be at the pivot point. This condition may be established by means including weights supported by the mirror or by a mirror assembly appropriately formed as a unitary structure.

Other features, objects and advantages of the invention will become apparent from the following specification when read in connection with the accompanying drawing in which:

FIG. 1 is a perspective view of an overhead-suspended mirror having counterbalancing weights according to the invention;

FIG. 2 is a side view, partially in section, of the structure shown in FIG. 1;

FIG. 3 shows the details of a counterbalancing structure suitable for attachment to existing mirrors;

FIG. 4 shows a view of a typical ball joint for supporting the mirror; and

FIG. 5 shows a preferred form of spring-loaded ball joint according to the invention.

With reference now to the drawing, and more particularly FIGS. 1 and 2 thereof, there is shown a typical automobile mirror 10 pivotally attached to a supporting base 11 which in turn is secured to the overhead portion 12 of an automobile. A pair of counterweights 13 and 14 are attached to the mirror 10 by means including a respective upper clamp 15 and lower clamp 16, preferably symmetrical about the center line of the mirror 10 so that the summation of moments about a horizontal fore-aft axis passing through the mirror pivot point is substantially zero. A counterweight 13 or 14 along a direction parallel to this fore-aft axis is located so that the moment about the horizontal axis at right angles to the fore-aft axis and passing through the mirror pivot point is substantially zero.

With reference to FIGS. 2 and 3, upper clamp 15 and lower clamp 16 preferably are force fit in upper recess 21 and lower recess 22, respectively, the vertical position of each clamp being adjusted by an upper set screw 23 and lower set screw 24, respectively. Set screws 23 and 24 are preferably pointed to engage an upper bracket hole 25 and lower bracket hole 26, respectively, thereby helping to prevent horizontal movement of brackets 15 and 16.

The recesses 21 and 22 are formed in the T-shaped member 27. The stem of member 27 has a threaded collar 28 for accommodating the threaded rod 31 which in turn supports weights 13 or 14.

Referring to FIG. 4, there is shown a detail of the ball joint 32 permitting relative movement in all directions of mirror 10 with respect to supporting member 11.

Referring to FIG. 5, there is shown a view, partially in section, of a preferred form of ball joint permitting relative movement between mirror 10 and supporting member 11. A generally hemispheric supporting shell 33 is secured to supporting member 11 by screw 30. A spherical ball 34 is secured to rod 35 of mirror 10, or otherwise rigidly fastened to rod 35, with the sector 36 of a hemispherical shell having substantially the same diameter as shell 33 surrounding the axis of rod 35 and located to the side of ball 34 where rod 35 is attached. Shells 33 and 36 are formed with opposed annular rims 37 and 38, respectively, held together by two or three spring-loaded screws like 41.

The screws 41 are tightened sufficiently to keep the mirror firmly positioned during normal driving. However, when it is desired to reposition the mirror, the springs 42 compress enough to allow shell 33 to move away from shell 36 and permit relatively easy relative movement between ball 34 and the assembly comprising the shells 33 and 36.

Should it be desired to support the mirror assembly for independent rotation about a number of axes, the results of the invention may be achieved by establishing the summation of moments about each axis substantially zero.

There has been described a novel automobile rear view mirror capable of being easily adjusted to any selected position and retaining that position in the presence of severe vibrations while requiring relatively little additional apparatus for attachment to a conventional rear view mirror. The additional apparatus is easy to attach and adjust and low in cost.

It is evident that those skilled in the art may now make numerous modifications of and departures from the specific embodiment described herein without departing from the inventive concepts. Consequently, the invention is to be construed as limited only by the spirit and scope of the appended claims.

What is claimed is:
1. A vehicular rear view mirror comprising,
   means defining a reflecting surface,
   support means,
   means for securing said reflecting surface defining means to said support means in normally stationary relationship and including means for establishing paths of relative angular movement between said reflecting surface and said support means about respective axes to permit selective adjustment of the relative position therebetween,
   said reflecting surface defining means itself characterized by respective first components of moment about each of said axes when a force acts on said reflecting surface defining means, and additional means attached to said reflecting surface defining means characterized by respective second components of moment about each of said axes when said force acts on said additional means,
said first components being of substantially equal magnitude and of opposite sense to said second components of moment,
said means for securing comprising a ball joint having a ball frictionally engaged by a socket,
and said additional means comprise first and second weights on opposite sides of the normally vertical plane that passes through said ball joint and is generally perpendicular to said reflecting surface when said surface is normally aligned in a vertical plane.

2. A vehicular rear view mirror in accordance with claim 1 wherein said ball joint comprises,
a ball,
and spring-loaded means surrounding said ball to normally maintain said spring-loaded means in fixed relationship to said ball while permitting easy forced relative movement between said spring-loaded means and said ball.

3. A vehicular rear view mirror in accordance with claim 2 wherein said spring-loaded means comprises, a split shell having portions of a spherical surface in contact with said ball,
and spring-loaded fasteners holding said split shell together and in contact with said ball.

References Cited by the Examiner

UNITED STATES PATENTS

| | | |
|---|---|---|
| 1,071,725 | 9/1913 | Franks. |
| 1,141,099 | 6/1915 | Anschutz-Kaempfe. |
| 1,576,037 | 3/1926 | Colbert et al. _____ 88—98 |
| 1,646,379 | 10/1927 | Whitehead _____ 88—98 |
| 1,685,544 | 9/1928 | La Hodny _____ 88—93 |
| 1,860,928 | 5/1932 | Flanigan. |
| 2,089,745 | 8/1937 | Graf. |
| 2,307,532 | 1/1943 | Murphy _____ 88—77 |
| 2,933,814 | 4/1960 | Thompson _____ 88—1 X |
| 2,948,189 | 8/1960 | Fischer _____ 88—32 |

FOREIGN PATENTS

| | | |
|---|---|---|
| 805,312 | 12/1958 | Great Britain. |
| 821,522 | 10/1959 | Great Britain. |

JEWELL H. PEDERSON, *Primary Examiner.*

O. B. CHEW, D. J. HOFFMAN, *Assistant Examiners.*